UNITED STATES PATENT OFFICE.

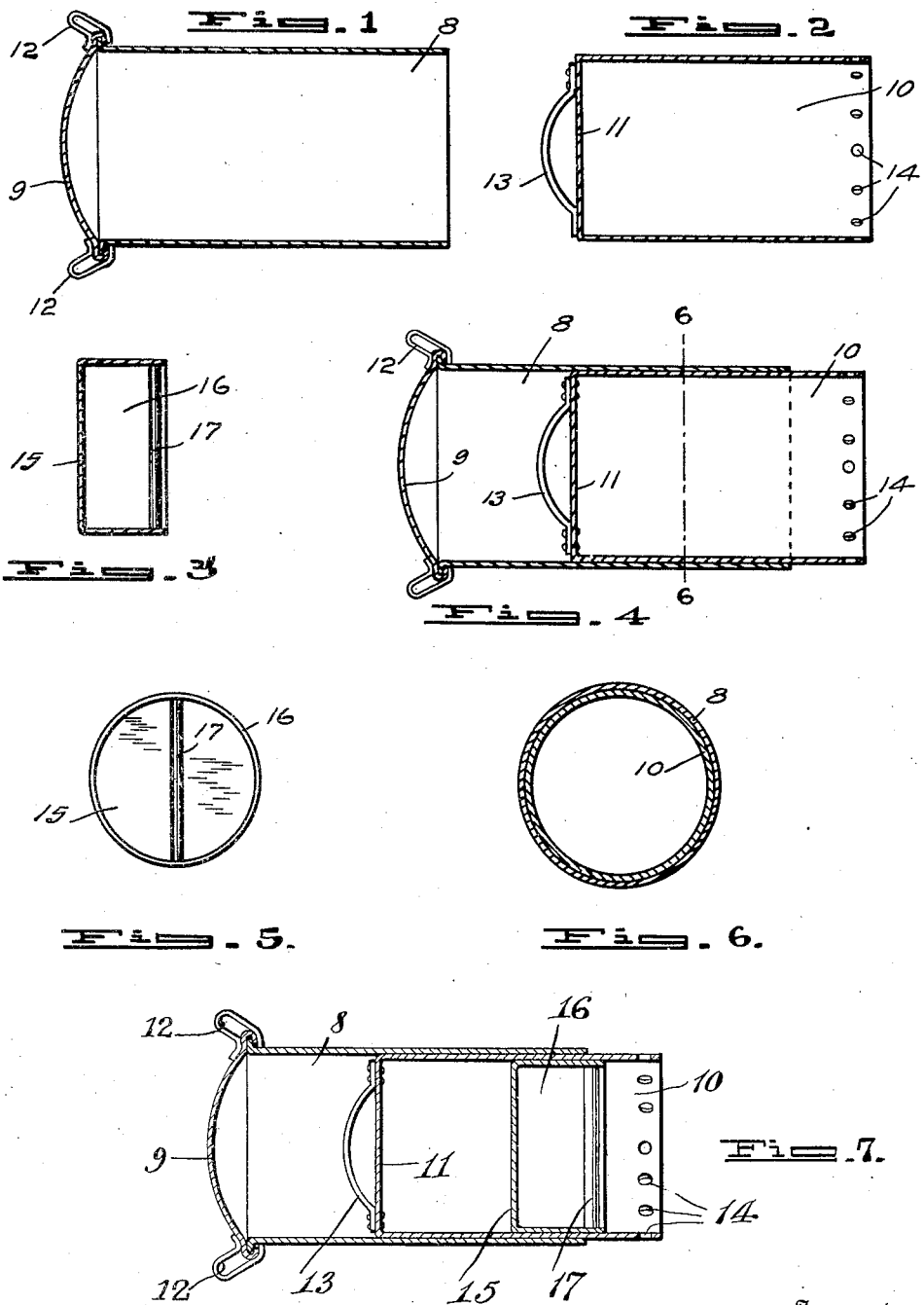

PAUL CAMMANS, OF SEATTLE, WASHINGTON.

SUBMERSIBLE COOKER.

1,331,620.          Specification of Letters Patent.      Patented Feb. 24, 1920.

Application filed March 1, 1919. Serial No. 280,439.

*To all whom it may concern:*

Be it known that I, PAUL CAMMANS, a subject of the Queen of Holland, residing at Seattle, in the county of King and State of Washington, have invented a certain new and useful Improvement in Submersible Cookers, of which the following is a specification.

My invention relates to improvements in submersible cookers and the object of my invention is to provide a submersible cooker embodying a plurality of receptacles that may be telescoped together to afford cooking compartments of various sizes and to provide a submersible cooker that will exclude water from the food that is being cooked and will afford an automatic adjustment when used for foods that expand when cooking.

A further object is to provide a submersible cooker comprising two cylindrical telescopic containers each closed at one end and open at the other end, the smaller container being adapted to telescope either open end foremost or closed end foremost into the larger container to thereby afford a larger or smaller receptacle for food.

I accomplish these objects by devices illustrated in the accompanying drawings, wherein—

Figure 1 is a view in longitudinal mid-section of a tubular container forming a part of my invention;

Fig. 2 is a similar view of a tubular container that is adapted to telescope within the container shown in Fig. 1;

Fig. 3 is a view in vertical section of a partition member that is adapted to be inserted within the container shown in Fig. 1;

Fig. 4 is a view in longitudinal mid-section showing the two larger tubular containers telescoped together;

Fig. 5 is a plan view of the partition member shown in Fig. 3;

Fig. 6 is a view in vertical cross-section on broken line 6, 6 of Fig. 4; and Fig. 7 is a view in longitudinal mid-section showing the two larger tubular containers telescoped together and the partition telescoped within one of the tubular containers.

Referring to the drawings throughout which like reference numerals indicate like parts, the numeral 8 designates the cylindrical walls of a tubular container which is open at one end and is provided at its other end with an outwardly curved end wall 9.

10 indicates a cylindrical tubular member which is open at one end and is provided at its opposite end with a straight end wall 11, the external diameter of the tubular member 10 being substantially the same as the internal diameter of the tubular member 8 so that the tubular member 10 may be telescoped within the tubular member 8 either end foremost and will fit snugly against the walls thereof.

The tubular member 8 is provided on its closed end with a plurality of finger holds 12 by which it may be lifted. The tubular member 10 is provided on its closed end with a handle 13, and is provided adjacent its open end with perforations 14 through which the fingers or an instrument may be inserted when the member 10 is being removed from the member 8.

In Fig. 3 I have illustrated a partition member comprising a flat end wall 15 and cylindrical side wall 16 to which is secured a diametrically arranged handle 17. The external diameter of the side wall 16 is substantially the same as the internal diameter of the tubular member 8 so that the partition member may be inserted within the tubular member 8 and will fit snugly against the wall thereof.

The several members are constructed so that when they are telescoped within each other the joints formed by the adjacent walls thereof will be substantially water tight so that when the cooker is immersed in boiling water the water from the exterior cannot enter the interior of the cooker and mix with the food contained therein.

When the cooker is to be used for cooking one food only such food may be placed in the tubular container 8 and the member 10 may then be inserted, closed end foremost, into the open end of the container 8 thereby confining the food in the smallest possible space.

The cooker may then be submerged in boiling water either in a vertical position or horizontal position and allowed to remain in such boiling water until the food is cooked. If the food is of a class that tends to expand upon cooking the expansion may take place freely without damage to the cooker, the tubular member 10 being forced outwardly within the tubular member 8 to afford additional room for the food as it expands.

If the amount of food to be cooked is more than can be contained in the tubular container 8 then a portion of such food may be placed in the container 8 and the balance may be placed in the container 10 and the container 10 may be telescoped with its open end foremost into the container 8 thereby affording a food receptacle of greater volume than the container 8.

If two kinds of food are to be cooked in the same container one food may be placed in the end of the container 8, the partition member shown in Fig. 3 may then be inserted within said container 8, another food may be placed within the container 8 on the partition member and the tubular member 10 may then be inserted open end foremost within the container 8 thereby having two different foods confined in the container and adapted to be cooked at one time.

It will be readily understood that in the manner described in the preceding paragraph either two small batches of food or two large batches of food or one large batch and one small batch of food may be cooked in my submersible cooker.

A cooker constructed in accordance with my invention is particularly well adapted for cooking cereals such as rice, oats, barley and the like, and is especially easy to operate in view of the fact that it is normally submerged in boiling water so that it requires little attention and is practically impossible to burn the food after it has been cooked.

A further advantage resides in the fact that the food is inclosed in a substantially steam tight receptacle which thereby prevents such food from drying out or changing its consistency during the operation of cooking.

Obviously there may be provided a plurality of partitions either to fit the tubular member 8 or the tubular member 10 whereby a plurality of foods may be cooked at the same time and changes may be made in the form of construction of my invention without departing from the spirit thereof.

What I claim is:

1. A submersible cooker comprising two hollow cylinders each having one closed end and one open end, one of said hollow cylinders being adapted to closely fit and telescope, either end foremost, within the other of said cylinders to form a variable food compartment.

2. A submersible cooker comprising two hollow cylinders each having one closed end and one open end, one of said hollow cylinders being adapted to closely fit and telescope either end foremost within the other of said cylinders and a partition adapted to fit closely and telescope within said smaller cylinder whereby two variable food compartments may be formed.

3. A submersible cooker comprising a hollow metallic cylinder closed at one end and open at the other end, and another hollow metallic cylinder that is closed at one end and open at the other end, said last named cylinder having a smooth exterior surface and being slightly smaller in diameter than said last named cylinder whereby it may fit snugly and telescope either end foremost within said larger cylinder.

In witness whereof, I hereunto subscribe my name this 21st day of February A. D. 1919.

PAUL CAMMANS.